United States Patent [19]

Clark, III et al.

[11] Patent Number: 4,557,837

[45] Date of Patent: Dec. 10, 1985

[54] SIMULATION AND CLEANUP OF OIL- AND/OR GAS-PRODUCING WELLS

[75] Inventors: Henry B. Clark, III, Oakdale; Myron T. Pike, Stillwater, both of Minn.

[73] Assignee: Minnesota Mining and Manufacturing Company, St. Paul, Minn.

[21] Appl. No.: 187,439

[22] Filed: Sep. 15, 1980

[51] Int. Cl.$^4$ .................. E21B 43/27; E21B 43/25
[52] U.S. Cl. .................. 252/8.55 C; 166/307; 166/308; 252/8.55 R; 252/307; 526/243
[58] Field of Search .................. 252/8.55 R, 8.55 B, 252/8.55 C, 307, 3; 166/308, 307; 526/243

[56] References Cited

U.S. PATENT DOCUMENTS

| | | | |
|---|---|---|---|
| 3,070,165 | 12/1962 | Stratton | 166/42 |
| 3,081,274 | 3/1963 | Heine | 526/243 |
| 3,089,846 | 5/1963 | Pitchford | 252/8.5 |
| 3,318,852 | 5/1967 | Dixon | 260/78.5 |
| 3,431,497 | 3/1969 | Manley | 325/326 |
| 3,470,124 | 9/1969 | Van Eygen et al. | 260/29.6 |
| 3,511,788 | 5/1970 | Keil | |
| 3,574,791 | 4/1971 | Sherman et al. | 260/884 |
| 3,654,244 | 4/1972 | Pittman et al. | 526/243 |
| 3,822,228 | 7/1974 | Petrella et al. | |
| 3,920,614 | 11/1975 | Kirimoto et al. | 260/63 |
| 3,937,283 | 2/1976 | Blauer et al. | 166/307 |
| 3,997,507 | 12/1976 | Kirimoto et al. | 526/243 |
| 4,147,851 | 4/1979 | Raynolds | 526/245 |
| 4,303,534 | 12/1981 | Hisamoto et al. | 252/3 |

OTHER PUBLICATIONS

Williams, Gidley, & Schechter; Acidizing Fundamentals; SPE; 1979 pp. 1–18 and 29–37.
Allen and Roberts; Production Operations; Oil & Gas Consultants International, Inc.; vol. II, pp. 118, 171–180.
Blauer and Holcomb; Foam Fracturing Shows Success in Gas, Oil Formations; The Oil and Gas Journal–Aug. 4, 1975; pp. 57–60.
Blauer and Kohlhaas; Formation Fracturing with Foam; Paper SPE 5003, Oct. 6, 1974.
Clark and Pike; The Use of Fluorochemical Surfactants in Non–Aqueous Stimulation Fluids; SPE 7894; Jan. 22, 1979.
Clark and Pike; Water Soluble Fluorochemical Surfactant Well Stimulation Additives; Prepared for May 28–30 SPE International Symposium.
Holcomb; Foamed Acid as a Means of Providing Extended Retardation; SPE 6376; Presented Mar. 10–11, 1977.
The Condensed Chemical Dictionary, Sixth Edition, pub. 1966 by Reinhold Pub. Co., New York, p. 828.

Primary Examiner—Herbert B. Guynn
Attorney, Agent, or Firm—Donald M. Sell; James E. Smith; David R. Cleveland

[57] ABSTRACT

Method for treating oil and gas wells using foamable fluids containing methanol, as well as foamable compositions and novel fluorochemicals useful therein.

16 Claims, No Drawings 4,557,837

SIMULATION AND CLEANUP OF OIL- AND/OR GAS-PRODUCING WELLS

TECHNICAL FIELD

This invention relates to a method for treating oil- and/or gas-producing wells using foamable fluids containing methanol. In addition, this invention relates to foamable methanol compositions. Also, this invention relates to certain novel fluorochemicals useful for foaming methanol.

BACKGROUND ART

In recent years, it has become common practice to inject well stimulation fluids into selected oil- or gas-bearing geological formations or strata in order to increase the productivity of such formations. Such well stimulation fluids generally operate by hydraulic fracturing of and/or acidic reaction with the formation, increasing the permeability of the formation by oil or gas and the rate of delivery of oil or gas to the wellhead. Hydraulic fracturing has long been practiced in the art using fluids such as native crude oil, lease crude oil, diesel fuel, kerosene, and water, with or without propping agents, such as sand, suspended therein (see, e.g., U.S. Pat. Nos. 3,070,165 and 3,089,846). Acidic treatment of a formation (frequently referred to as "acidizing") is also well-known in the art and is generally carried out using mineral acids such as HCl (in limestone formations) and HF (in sandstone formations), see, e.g., Williams, Gidley, and Schechter, *Acidizing Fundamentals*, SPE (1979), esp. pp. 1-18 and 29-37. It is also common practice to inject well cleanup fluids into oil- and gas-producing wells in order to increase the productivity of such wells. Such cleanup fluids generally remove scale and/or other foreign matter from the well bore. Such well cleanup fluids are well-known in the art, and are described in, e.g., Williams, Gidley, and Schechter, id., and in Allen and Roberts, *Production Operations*, Oil and Gas Consultants Intl. Inc. (1978), see esp. Vol. II, pages 118 and 171-180. For purposes of brevity, well stimulation and well cleanup fluids will sometimes be referred to hereafter as "well treatment fluids".

Some oil- and gas-bearing formations respond especially well to well treatment fluids containing methanol or aqueous methanol mixtures, particularly if such formations contain water-sensitive materials such as water-swellable clays. Such water-sensitive materials tend to interact with water present in the surrounding formation, and can swell and/or migrate within the formation, thereby reducing the permeability of the oil- or gas-bearing formation and diminishing the productivity thereof.

It is often useful to foam well treatment fluids prior to introduction of such fluids into the well bore. Such foamable fluids are described in, e.g., U.S. Pat. No. 3,937,283, and publications such as Blauer and Holcomb, "Foam Fracturing Shows Success in Oil and Gas Formations", *Oil and Gas Journal* (August, 1975) pp. 57-60, Blauer and Kohlhaas, "Formation Fracturing with Foam", paper (No. SPE 5003) presented at the fall meeting of the Society of Petroleum Engineers, Houston, Tex., Oct. 6-9, 1974, and Holcomb, "Foamed Acid as a Means of Providing Extended Retardation", paper (No. SPE 6376) presented at the 1977 Meeting of the Society of Petroleum Engineers, Conference on Permian Basin Oil and Gas Recovery, Midland, Tex., Mar. 10-11, 1977.

It is generally difficult to form stable, long-lasting foams in well treatment fluids containing appreciable amounts of methanol. Foamable, methanol-containing well treatment fluids currently used in the field are generally made foamable by adding thereto water and conventional hydrocarbon-based surface-active agents, such as sulfated polyethoxylated alcohols. It would be desirable to eliminate some or all of such water in well treatment fluids used in water-sensitive formations.

Certain substantially water-free methanol-containing foamable well stimulation fluids, containing fluorochemical-based surface-active agents, are described in Clark, Pike, and Rengel, "The Use of Fluorochemical Surfactants in Non-Aqueous Stimulation Fluids", paper (No. SPE 7894) presented at the 1979 meeting of the Society of Petroleum Engineers, International Symposium on Oil Field and Geothermal Chemistry, Houston, Tex., Jan. 22-24, 1979. Certain fluorochemicals for use as surface tension depressants in well stimulation fluids are described in Clark, Pike, and Rengel, "Water Soluble Fluorochemical Well Stimulation Additives", paper (No. SPE 9008) presented at the 1980 meeting of the Society of Petroleum Engineers, International Symposium on Oilfield and Geothermal Chemistry, Stanford, Calif., May 28-30, 1980, a paper relating to non-foamed aqueous well stimulation fluids. The former Clark, Pike, and Rengel paper No. SPE 7894 contains a disclosure of a substantially water-free methanol-containing well stimulation fluid, a fluid rendered foamable by use of a fluorochemical surface-active agent identified therein as "FC-B". The fluorochemical surface-active agent FC-B is a fluoroaliphatic radical-containing surface-active agent having ester linkages and polyoxyalkylene solubilizing moieties.

Foam-forming capabilities of a well treatment fluid can be demonstrated using a foam generator described in the Clark, Pike, and Rengel paper No. SPE 7894. Such foam-forming capabilities are expressed in terms of "foam quality" and "foam half-life". Foam quality represents the percentage of a foamed fluid which is occupied by trapped gas, with higher foam quality numbers representing more desirable foams. Foam quality is commonly denoted using the Greek symbol gamma ($\Gamma$). Foam half-life represents the time period in seconds required for one half of the liquid present in the foam to drain as a separate liquid phase, and is generally denoted by the symbol $t_{\frac{1}{2}}$. Reagent grade methanol containing 1% of the above-described fluorine-containing oligomer was shown in the Clark, Pike, and Rengel paper No. SPE 7894 to have a foam quality of 60 and a foam half-life of 25 seconds.

DISCLOSURE OF INVENTION

The present invention provides, in one aspect, in a method for treating an oil- and/or gas-bearing formation by injecting therein a methanol-containing well treatment fluid, the improvement comprising adding to said fluid an amount, sufficient to make said fluid foamable, of oligomer as methanol foaming agent, said oligomer comprising:

(a) an oligomeric backbone;

(b) three or more fluorine-containing moieties of the formula $R_fQ$ attached to said backbone, wherein $R_f$ is a monovalent, fluorinated (preferably perfluorinated) aliphatic radical termination in at least one perfluoromethyl group (e.g., $C_6F_{13}$—), and having 5 to 14 or more carbon atoms, and Q is a linkage or bridge, generally divalent (e.g., —SO$_2$N(CH$_3$)C$_2$H$_4$OCO—) through which R$_f$ is attached to said backbone; and (c) two or more moieties of the formula AQ' attached to said backbone, wherein A is a polar methanol-solubilizing group, generally monovalent (e.g., —COOH), Q' is a linkage or bridge, generally divalent (e.g., —C$_2$H$_4$—) through which A is attached to said backbone, greater than about 10% by weight AQ' moieties are present in said oligomer, and AQ' is a radical which, when the valence bonds of AQ' are satisfied by hydrogen atoms, has a solubility in methanol at 25° C. of at least about 20% by weight;

said oligomer containing between about 10 and about 50% by weight fluorine, and said fluid having at 25° C. a foam quality of at least about 60 and a foam half-life of at least about 50 seconds.

The present invention also provides foamable fluid compositions useful for well treatment. In addition, the present invention provides novel fluoropolymers for use in foaming methanol or methanol-containing solutions.

DETAILED DESCRIPTION

The oligomeric backbone is generally composed of repeating units to which the R$_f$Q and AQ' moieties are attached. Such repeating units can be carbon-carbon chains, such as polyvalent aliphatic, e.g., —CH$_2$CH$_2$— and —CH$_2$CH(CH$_2$—)$_2$, polyvalent aromatic, e.g.,

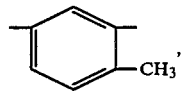

and linking groups which can connect such chains together, such as oxy, thio, carbonyl, sulfone, sulfoxy, imino, e.g., —NH— and —N(C$_2$H$_5$)—, and combinations thereof, such as oxyalkylene, iminoalkylene, iminoarylene, sulfonamido, carbonamido, sulfonamidoalkylene, carbonamidoalkylene, urethane, e.g., —CH$_2$CH$_2$OCONH— and

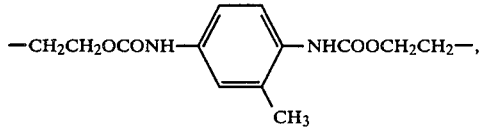

and urea, e.g., —NHCONH—. The backbone for a specific oligomer useful in this invention will be dependent upon the ease of preparation of such an oligomer and the availability of necessary precursors thereof. In a preferred embodiment of this invention, the backbone is a repeating unit having a carbon-carbon chain and results from free-radical initiated solution or emulsion polymerization of one or more fluoroaliphatic radical-containing acrylate monomers and one or more ethylenically unsaturated polar comonomers such as substituted or unsubstituted acrylic or methacrylic acid. Other methods of preparation of the fluoroaliphatic radical-containing oligomeric composition can result in other backbone structures, and are described in greater detail below.

The oligomers used in this invention are generally low molecular weight polymers (i.e., they have a number average molecular weight below about 100,000). Such oligomers are generally mixtures rather than pure compounds. As used herein, the word "oligomer" includes such mixtures. The oligomers of this invention can be copolymers of 2, 3, 4 or more monomers, and can contain pendant moieties other than the R$_f$Q— and AQ'— moieties mentioned above, as long as the utility of such oligomers as methanol foamers is not unduly diminished by the presence of such other pendant moieties in the oligomer. Also, the oligomers of this invention can be random or segmented copolymers.

R$_f$ is a monovalent, fluorinated aliphatic, preferably saturated, organic radical having an average of at least 5 carbon atoms. The skeletal chain of R$_f$ can be straight, branched, or, if sufficiently large, cyclic, and can include divalent oxygen atoms or trivalent nitrogen atoms bonded only to carbon atoms. Preferably, R$_f$ is fully fluorinated, but hydrogen or chlorine atoms can be present as substituents on the skeletal chain, provided that not more than one atom of either hydrogen or chlorine is present for every two carbon atoms in the skeletal chain, and R$_f$ contains at least a terminal perfluoromethyl group. While radicals containing a large number of carbon atoms will function adequately, radicals containing not more than about 14 carbon atoms are preferred since larger radicals usually represent a less efficient utilization of fluorine than is possible with smaller radicals. Preferably, R$_f$ has about 6 to 10 carbon atoms. The fluoroaliphatic radical-containing oligomers of this invention can contain R$_f$ radicals which are the same as, or different from, one another.

The function of the linkage or bridge Q is to bond the fluoroaliphatic radicals, R$_f$, to the oligomer backbone. Q is generally divalent, although it can be polyvalent (e.g., trivalent). Q can be a valence bond, in which case a fluoroaliphatic radical is bonded or linked directly to the oligomer backbone. Q can also be one or more linking groups such as polyvalent aliphatic, e.g., —CH$_2$CH$_2$— and —CH$_2$CH(CH$_2$—)$_2$, polyvalent aromatic, e.g.,

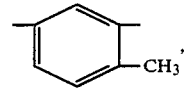

oxy, thio, carbonyl, sulfone, sulfoxy, imino, e.g., —NH— and —N(C$_2$H$_5$)—, and combinations thereof, such as oxyalkylene, iminoalkylene, iminoarylene, sulfonamido, carbonamido, sulfonamidoalkylene, carbonamidoalkylene, urethane, e.g., —CH$_2$CH$_2$OCONH— and urea, e.g., —NHCONH—. The linkage Q for a specific oligomer of this invention will be dependent upon the ease of preparation of such oligomer and the availability of necessary precursors thereof. This linkage can have a wide variety of structures. However large Q is, the fluorine content (the locus of which is R$_f$) of the oligomeric composition is within the aforementioned limits set forth in the above description.

The fluorine-content limits described above have an important effect upon the foam stability of methanol-containing fluids of this invention. If a series of oligomers having different levels of fluorine content are prepared from monomers containing R$_f$Q moieties and AQ' moieties, foam quality and foam half-life of solutions of such oligomers in methanol first increase and then decrease as fluorine content goes from 0 to more than 50 wt. %. Foam quality above about 60 and foam half-life above about 50 seconds at a 1 wt. % concentration of oligomer in methanol are generally obtained at a fluorine content between about 10 and 50 weight percent. Foam quality and foam half-life can sometimes change drastically with very slight changes in fluorine content, so empirical testing of oligomers containing low (viz., about 10 wt. %) or high (viz. about 50 weight %) amounts of fluorine is sometimes necessary to determine if methanol solutions of such oligomers will provide adequate foam quality and foam half-life. If foam quality and foam half-life for such oligomers (viz., those oligomers containing low or high amounts of fluorine) is desired to be increased, then fluorine content should be adjusted (viz., by increasing fluorine content if it is near about 10 wt.%, or by lowering fluorine content if it is near about 50 wt.%), or the concentration of the oligomer in methanol should be increased.

In the fluoroaliphatic radical-containing oligomers of this invention, the Q linkages can be the same as or different from one another. Also, the $R_fQ$ moieties can be the same as or different from one another.

The A group is a polar methanol-solubilizing group, preferably having hydroxyl or carboxyl functionality. The A group can also have structures such as amido, amino, imino, sulfo (i.e., $HO_3S-$), and phosphono (i.e., $(HO)_2OP-$). A is preferably monovalent. Fluoro-aliphatic radical-containing oligomers of this invention can contain A groups which are the same as, or different from, one another.

The function of the linkage or bridge Q' is to bond the polar methanol-solubilizing groups, A, to the oligomer backbone. Q' is generally divalent, although it can be polyvalent (e.g., trivalent). Q' can be a valence bond, in which case an A group is bonded or linked directly to the backbone. Q' can also be one or more linking groups such as polyvalent aliphatic, e.g., $-CH_2CH_2-$ and $-CH_2CH(CH_2-)_2$, polyvalent aromatic, e.g.,

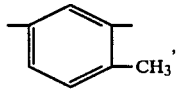

oxy, thio, carbonyl, sulfone, sulfoxy, imino, e.g., $-NH-$ and $-N(C_2H_5)-$, and combinations thereof, such as oxyalkylene, iminoalkylene, iminoarylene, sulfonamide, carbonamido, sulfonamidoalkylene, carbonamidoalkylene, urethane, e.g., $-CH_2CH_2OCONH-$ and urea, e.g., $-NHCONH-$. The linkage Q' for a specific oligomer of this invention will be dependent upon the ease of preparation of such oligomer and the availability of necessary precursors thereof.

Together, the A group and Q' linkage form a radical (referred to herein as AQ') which, when the valence bonds of said radical are satisfied by hydrogen atoms, has a solubility in methanol at 25° C. of at least about 20% by weight. For example, in an oligomer of this invention prepared from the solution polymerization of a fluoroaliphatic radical-containing acrylate and hydroxyethyl acrylate, the A group is $-OH$, the Q' linkage is $-C(O)OC_2H_4-$, and the AQ' radical is $.C(O)OC_2H_4OH$. When the valence bond depicted for such AQ' radical is satisfied by hydrogen, the resulting compound is $HC(O)OC_2H_4OH$, or hydroxyethyl formate. The solubility of hydroxyethyl formate in methanol at 25° C. is greater than 20% by weight. Other AQ' radicals can be similarly evaluated to determine if they meet the above-described methanol solubility criterion. In a fluoroaliphatic radical-containing oligomer of this invention, the AQ' radicals can be the same as, or different from, one another. The AQ' radicals can contain polar groups such as oxyalkylene linkages, poly(oxyalkylene) linkages, or ester linkages, but where such linkages are present, such radicals must also contain a polar methanol-solubilizing group A as described above, and such radicals must meet the above-described methanol solubility criterion.

Preferably the fluorine content of the fluorinated oligomers of this invention is located primarily within $R_f$ although small amounts of fluorine can be present in A, Q', or in the oligomeric backbone.

Some fluoroaliphatic radical-containing oligomers used in the method of this invention and contained in the well treatment fluids of this invention are known in the art, see U.S. Pat. Nos. 3,318,852, 3,431,497, 3,470,124, 3,574,791, 3,920,614 and 4,147,851, while others are novel per se and their preparation is described hereinafter.

Fluoroaliphatic radical-containing oligomers within the scope of this invention can be prepared from free-radically polymerizable monomers containing the $R_fQ$ moieties and comonomers containing the AQ' moieties. Such fluoroaliphatic radical-containing oligomers are generally prepared using emulsion, bulk, or solution polymerization techniques well known to those skilled in the art. Among the solvents which can be used as media in solution polymerizations are tetrahydrofuran, ethyl acetate, butyl acetate, methyl ethyl ketone, methyl isobutyl ketone, methanol, ethanol, isopropyl alcohol, isobutyl alcohol, ethyleneglycol monoethyl ether, diethyleneglycol monoethyl ether, acetone, trichlorofluoromethane, 1,1-2-trichloro-1,2,2-trifluoroethane, toluene, benzotrifluoride, xylene hexafluoride, 1,1,1-trichloroethane, and combinations thereof. Tetrahydrofuran and mixtures of ethanol and ethyl acetate are preferred solvents for such polymerizations. As discussed above, the preferred method for preparing such oligomers is by solution or emulsion polymerization of one or more fluoroaliphatic acrylate or methacrylate monomers with one or more ethylenically unsaturated polar comonomers. Such fluoroaliphatic acrylates and methacrylates have the general formula $R_fQOC(O)C(R)=CH_2$, where $R_f$ and Q are as described above and R is H or $CH_3$. Such ethylenically unsaturated polar comonomers have the general formula AQ'R', where A and Q' are as described above and R' contains a carbon-carbon double bond.

Representative fluoroaliphatic acrylate and methacrylate monomers useful in such preparation include:

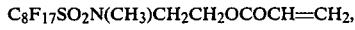
$C_8F_{17}SO_2N(CH_3)CH_2CH_2OCOCH=CH_2$,

$C_6F_{13}CH_2CH_2OCOC(CH_3)=CH_2$,

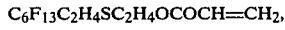
$C_6F_{13}C_2H_4SC_2H_4OCOCH=CH_2$,

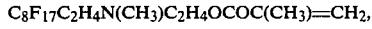
$C_8F_{17}C_2H_4N(CH_3)C_2H_4OCOC(CH_3)=CH_2$,

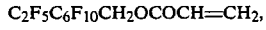
$C_2F_5C_6F_{10}CH_2OCOCH=CH_2$,

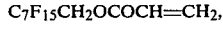
$C_7F_{15}CH_2OCOCH=CH_2$,

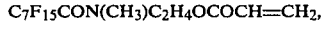
$C_7F_{15}CON(CH_3)C_2H_4OCOCH=CH_2$, $(CF_3)_2CF(CF_2)_6CH_2CH(OH)CH_2OCOCH=CH_2,$ $(CF_3)_2CFOC_2F_4C_2H_4OCOCH=CH_2,$ $C_8F_{17}C_2H_4SO_2N(C_3H_7)C_2H_4OCOCH=CH_2,$ $C_7F_{15}C_2H_4CONHC_4H_8OCOCH=CH_2,$ $$C_3F_7(\underset{CF_3}{C}FCF_2O)_2\underset{CF_3}{C}FCH_2OCOCH=CH_2,$$

$C_7F_{15}COOCH_2C(CH_3)_2CH_2OCOC(CH_3)=CH_2,$ $C_8F_{17}SO_2N(C_2H_5)C_4H_8OCOCH=CH_2,$ $(C_3F_7)_2C_6H_3SO_2N(CH_3)C_2H_4OCOCH=CH_2,$ $$C_2F_5-CF\underset{CF_2CF_2}{\overset{CF_2CF_2}{\diagup\!\!\!\diagdown}}NCF_2CF_2CON(CH_3)C_2H_4OCOCH=CH_2,$$

$C_8F_{17}CF=CHCH_2N(CH_3)C_2H_4OCOCH=CH_2,$ and combinations thereof.

Representative ethylenically unsaturated polar comonomers useful in such preparation include:

$CH_2=CHCOOCH_2CH_2OH,$ $CH_2=CHP(O)(OH)_2,$ $CH_2=CHCOOH,$ $CH_2=C(CH_3)COOH,$ $CH_2=CHCONHCH_2CH_2OH,$ $HOOCC(=CH_2)CH_2COOH,$ $CH_2=CHCO(OCH_2CH_2)_3OH,$ $CH_2=CHSO_3H,$ $CH_2=CHCH_2SO_3H,$ $CH_2=CHOCH_2CH(OH)CH_2OH,$ $CH_2=C(CH_3)CON(CH_3)_2,$ $CH_2=CHCONHCH_2CH_2CH_2N(CH_3)_2,$ $$CH_2=CHN\underset{\underset{O}{\overset{\|}{C}}-CH_2}{\overset{CH_2-CH_2}{\diagup\!\!\!\diagdown}},$$

and combinations thereof.

Other fluoroaliphatic radical-containing oligomers useful in this invention can be prepared by solution or emulsion polymerization of one or more fluoroaliphatic vinyl monomers such as perfluoroalkylacrylamides, perfluoroalkylthioacrylates, perfluoroalkylethylenes, vinyl and allyl esters of perfluoroalkanoic acids, perfluoroalkylvinyl ethers, etc., with one or more ethylenically unsaturated polar comonomers such as those listed above. Such fluoro-aliphatic vinyl monomers generally have the formula $(R_fQ)_pC(=CH_2)(R'')_q$ where $R_f$ and Q are as defined above, R'' is H or lower ($C_{1-6}$) alkyl, p is 1 or 2, q is 0 or 1, and p+q is 2.

Representative fluoroaliphatic vinyl monomers useful in such preparations include:

$C_8F_{17}CH_2CH_2N(CH_3)COCH=CH_2$ $C_6F_{13}C_2H_4SC_2H_4SCOCH=CH_2,$ $C_8F_{17}SO_2N(C_2H_5)C_2H_4NHCOCH=CH_2,$ $(CF_3)_2CF(CF_2)_8C_2H_4SCOC(CH_3)=CH_2,$ $C_8F_{17}SO_2N(CH_3)C_2H_4COOCH=CH_2,$ $C_8F_{17}SO_2N(CH_3)CH_2C_6H_4CH=CH_2,$ $C_6F_{13}CH_2CH_2OOCC(=CH_2)COOCH_2CH_2C_6F_{13},$ $C_7F_{15}CH_2OOCCH=CHCOOCH_2C_7F_{15},$ $C_6F_{13}C_2H_4N(CH_2CH_2OH)COCH=CH_2,$ $C_7F_{15}CON(C_2H_5)C_3H_6SCOC(CH_3)=CH_2,$ $C_6F_{13}CH_2NHCOCH=CH_2,$ $C_8F_{17}CH_2CH_2OCH=CH_2,$ and combinations thereof.

The fluoroaliphatic radical-containing oligomers useful in this invention can also contain other pendant groups which do not interfere with the function of such oligomers as methanol foamers. Such pendant groups can be part of the oligomer component corresponding to one or more copolymerizable ethylenically unsaturated monomers, e.g., ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl and epoxyalkyl esters of acrylic acid, methacrylic acid and α-chloroacrylic acid, methacrylonitrile, vinylcarbazole, vinyl pyridine, vinyl alkyl ethers, vinylalkyl ketones, butadiene, chloroprene, fluoroprene, isoprene, and combinations thereof.

When the fluoroaliphatic radical-containing oligomers used in this invention are prepared by free-radically initiated polymerization, a free-radical initiator is generally employed. Such free-radical initiators are well known in the art, and include benzoyl peroxide, azobisisobutyronitrile, di(t-butyl)peroxide, cumene hydroperoxide, hydrogen peroxide, and trioctylmethylammonium persulfate.

Generally about 0.1 to 2 weight % (based upon the total weight of copolymerizable monomers) free-radical initiator can be used for such preparation.

A chain transfer agent can also be employed in the preparation of such oligomers. Such chain transfer agents are well known in the art, and include n-octyl mercaptan, mercaptoacetic acid, and p-toluenethiol.

A preferred chain transfer agent is n-octyl mercaptan. Generally, about 0 to 4 weight % (based upon the total weight of copolymerizable monomers) chain transfer agent can be used, with larger amounts of chain transfer agent resulting in an oligomeric product having lower molecular weight. Preferably, the fluoroaliphatic radical-containing oligomers used in this invention are prepared using a chain transfer agent, in an amount of about 0.2 to 2 weight % chain transfer agent.

Solution polymerization of the fluoroaliphatic radical-containing oligomers used in this invention is carried out by known procedures in a reaction vessel such as a stirred flask or a sealed vessel having external means for heating or cooling the reaction vessel. The reaction temperature is generally between about 40° and 90° C., preferably between 55° and 70° C., and the reaction is generally maintained for a time period of about 6 to 24 hours. The temperature and time required for essentially complete polymerization will depend on the reactivities of the precursor monomers, the type and concentration of catalyst, nature of the solvent, etc. Reactions of acrylate monomers using 0.7 weight % of azobisisobutyronitrile catalyst and ethyl acetate solvent, and carried out with agitation in a sealed glass reactor, are usually run for about 16 hours at about 60° C.

In addition to the free-radically initiated polymerization methods described above, the fluoroaliphatic radical-containing oligomers of this invention can also be prepared by other conventional methods. As an example of one such conventional method of oligomer preparation, polymers such as polyacrylic acid and carboxymethylcellulose, which have pendant carboxyl groups (i.e., AQ' moieties), can be partially esterified with a fluoroaliphatic alcohol to introduce pendant fluoroaliphatic ester groups (i.e., $R_fQ$ moieties) thus yielding oligomers having both $R_fQ$ and AQ' moieties along the polymer chain.

Also, oligomers useful in this invention can be prepared by the addition of fluoroaliphatic thiols or perfluoroalkyl iodides across some of the remaining double bonds in partially sulfonated butadiene-styrene copolymers, or butadiene-hydroxyethyl acrylate copolymers. In addition, perfluoroaliphatic radicals and chlorine atoms can be added across some of such remaining double bonds by the free-radically catalyzed reaction of such copolymers with perfluoroalkanesulfonyl chlorides.

Further useful oligomers can be prepared by the reaction of fluoroaliphatic alcohol or amine compounds with maleic anhydride copolymers, (e.g., ethylene-maleic anhydride copolymer), to cause opening of the cyclic anhydride functional group resulting in the formation of pendant carboxyl groups and pendant fluoroaliphatic ester or amide groups.

A preferred class of well treatment fluid compositions of this invention contain methanol together with an amount, sufficient to make said fluid foamable, of oligomer as methanol foaming agent, said oligomer comprising three or more units of the formula:

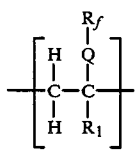

I and two or more units of the formula:

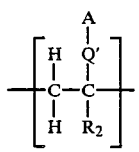

II wherein:
$R_f$, Q, and Q' are as defined above;
$R_1$ is H or $CH_3$;
$R_2$ is H, $CH_3$, or Cl;
A contains at least one carboxyl group; greater than about 10% by weight AQ' moieties are present in said oligomer; and each of said units is the same as or different from other of said units in said oligomer;
said oligomer containing between about 10 and about 50% by weight fluorine, and said fluid having at 25° C. a foam quality of at least about 60 and a foam half-life of at least about 50 seconds.

Such oligomers can contain other repeating units and pendant groups which do not interfere with the function of the oligomer as a methanol foamer. Also, such oligomers can be random or segmented polymers.

Such oligomers can be prepared from free-radically initiated polymerization of one or more fluoroaliphatic radical-substituted acrylate or methacrylate monomers with one or more carboxyl-containing ethylenically unsaturated comonomers. Suitable fluoroaliphatic radical-substituted acrylate or methacrylate monomers include the representative fluoroaliphatic acrylates and methacrylates listed above. Suitable carboxyl-containing ethylenically unsaturated comonomers include:

$CH_2=CHCOOH$, $CH_2=C(CH_3)COOH$, $HOOCC(=CH_2)CH_2COOH$, and combinations thereof. Acrylic acid is a preferred carboxyl-containing ethylenically unsaturated comonomer.

A novel class of fluoroaliphatic radical-containing oligomers useful as methanol foamers are oligomers consisting essentially of three or more units of the formula:

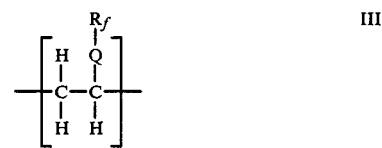

III and two or more units of the formula:

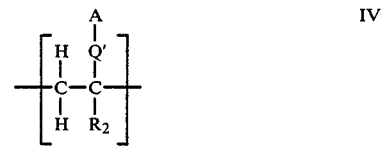

IV wherein:
$R_f$, Q, Q', and $R_2$ are as defined above;
A contains at least one carboxyl group; greater than about 10% by weight AQ' moieties are present in said oligomer; and each of said units is the same as or different from other of said units in said oligomer;
said oligomer containing between about 10 and about 50% by weight fluorine. Such oligomers can be random or segmented copolymers.

Such novel oligomers can be prepared from free-radically initiated polymerization of one or more fluoroaliphatic radical-substituted acrylate monomers with one or more carboxyl-containing ethylenically unsaturated comonomers. Suitable fluoroaliphatic radical-substituted acrylates include:

$C_8F_{17}SO_2N(CH_3)CH_2CH_2OCOCH=CH_2$, $C_6F_{13}C_2H_4SC_2H_4OCOCH=CH_2$, $C_2F_5C_6F_{10}CH_2OCOCH=CH_2$, $C_7F_{15}CH_2OCOCH=CH_2$, $C_7F_{15}CON(CH_3)C_2H_4OCOCH=CH_2$, $(CF_3)_2CF(CF_2)_6CH_2CH(OH)CH_2OCOCH=CH_2$, $(CF_3)_2CFOC_2F_4C_2H_4OCOCH=CH_2$, $C_8F_{18}C_2H_4SO_2N(C_3H_7)C_2H_4OCOCH=CH_2$, $C_7F_{15}C_2H_4CONHC_4H_8OCOCH=CH_2$, $$C_3F_7(\underset{CF_3}{\underset{|}{C}}FCF_2O)_2\underset{CF_3}{\underset{|}{C}}FCH_2OCOCH=CH_2$$

$C_8F_{17}SO_2N(C_2H_5)C_4H_8OCOCH=CH_2$, $(C_3F_7)_2C_6H_3SO_2N(CH_3)C_2H_4OCOCH=CH_2$,

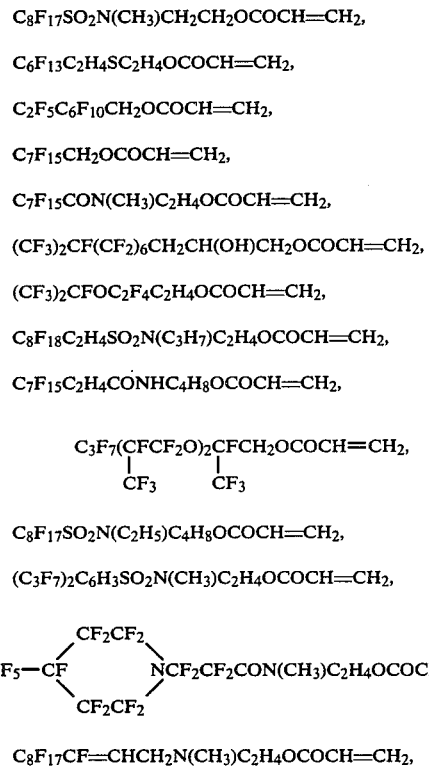

$C_8F_{17}CF=CHCH_2N(CH_3)C_2H_4OCOCH=CH_2$, and combinations thereof.

Suitable carboxyl-containing ethylenically unsaturated comonomers include those shown above.

Preferred members of the above-described class of novel fluoroaliphatic radical-containing oligomers include copolymers of about 20 to about 90 weight percent (most preferably about 70 to about 80 weight percent) $R_4SO_2N(R''')C_2H_4OCOCH=CH_2$, where $R'''$ is H or $C_{1-6}$ alkyl, with about 80 to about 10 weight percent (most preferably about 30 to about 20 weight percent) acrylic acid. Such preferred members can also be prepared using additional, optional copolymerizable comonomers such as ethyl acrylate.

When the fluoroaliphatic radical-containing oligomers used in this invention are added to methanol, the resulting solution is made foamable. Also, when such oligomers are added to foamable fluids containing methanol and other liquids (e.g., water), then stable foams are generally more readily formed in such fluids. "Foamable", as used herein, refers to the ability of such methanol solutions and methanol-containing fluids to be aerated, agitated, or otherwise combined with a gas to form a froth or foam.

When a well treatment fluid composition of the present invention is prepared, the composition generally contains between about 0.02 and 2 weight % (based on the total weight of liquid components in such composition) fluoroaliphatic radical-containing oligomer, preferably about 1% or less fluorinated oligomer. Some of the oligomers used in this invention yield cloudy methanol solutions at such concentrations. Although such cloudiness is not believed to affect the utility of such oligomers as methanol foamers, some practitioners of this invention may prefer to use clear (i.e., transparent, with the clarity of water) methanol-containing well treatment fluids. Such clear fluids can sometimes be obtained by altering the oligomer polymerization conditions. Both clear and cloudy methanol-containing fluids are shown below in the Examples.

The amount of oligomer should be sufficient to give a foam quality of at least about 60 and a foam half-life of at least about 50 seconds. As used herein, foam quality and foam half-life are measured using the foam generator test described in the aforementioned Clark, Pike, and Rengel paper No. SPE 7894. The well treatment fluids of this invention contain methanol, and can also contain water and any desired well treatment adjuvants. Such adjuvants can include mineral acids (e.g., HCl and HF), organic acids (e.g., $CH_3COOH$ and HCOOH), clay swelling inhibitors (e.g., KCl), clay stabilizers (e.g., hydroxy alumina), iron chelating agents (e.g., citric acid), anti-emulsifying agents, gelling agents, friction reducers, corrosion inhibitors, or fluid loss additives. Also, when the well stimulation fluids of this invention are used as fracturing fluids, such fluids generally contain proppants such as graded sand (e.g., Ottawa sand), river sand, glass beads, aluminum pellets, or walnut shells. The ratio of methanol and water (if any water is used) and the type and amount of adjuvants and propping agents used in the well treatment fluids of this invention can vary greatly and will depend upon the characteristics of the formation to be treated, the production and treatment history of the well to be treated, and other variables well known to those skilled in the art.

The following examples are offered to aid understanding of the present invention and are not to be construed as limiting the scope thereof.

EXAMPLE 1

In a glass reaction vessel was placed a monomer mixture consisting of 28 g of $C_8F_{17}SO_2N(CH_3)C_2H_4OCOCH=CH_2$ and 12 g $CH_2=CHCOOH$ (weight ratio 7:3, mole ratio 1:4). To this mixture was added 40 g tetrahydrofuran solvent, 0.06 g azobisisobutyronitrile polymerization initiator, and 0.4 g n-octyl mercaptan chain transfer agent. The reaction vessel was flushed with nitrogen, sealed, placed in a water bath maintained at 60° C. and tumbled for 16 hours. The reaction vessel was then removed from the water bath and allowed to cool before opening.

The resulting oligomeric product (in tetrahydrofuran solution) was added to reagent grade methanol to form a 1% by weight solution of oligomer in methanol. A 150 ml quantity of the oligomer/methanol solution was then placed in the pressure vessel of a foam generator described in the above-mentioned Clark, Pike, and Rengel paper No. SPE 7894. The pressure vessel was a 150 cm³ stainless steel gas sampling cylinder (part no. 304-HDF4-150, commercially available from the Whitey Company), fitted with valves at each end. The inlet end of the pressure vessel was supplied with nitrogen at one MPa pressure. The outlet end of the presure vessel led to a foam generator head having a 1.58 mm diameter chamber, a 0.79 mm diameter × 1.27 mm long constriction, and a 1.78 mm diameter outlet chamber. Four 0.79 mm diameter radial venturis allowed atmospheric air to enter the outlet chamber about 1.3 mm downstream from the outlet end of the constriction. The outlet end of the foam generator head was connected to a 150 mm×64 mm O.D. copper delivery tube terminated with a 50 mm long×5 mm I.D. glass tube. The glass tube contained a rolled 30 mm×30 mm section of 60 mesh stainless steel wire gauze.

The nitrogen valve at the inlet end of the pressure vessel was opened fully. Next, the valve at the outlet end of the pressure vessel was opened, allowing the oligomer/methanol solution to escape through the foam generator head and form a foam as the solution exited the outlet chamber. Foam properties were enhanced as the foam passed through the glass tubing containing the wire gauze. The foam stream was allowed to exit freely for a few seconds in order to allow foam conditions to stabilize, then a sample of foam was collected in a graduated cylinder, weighed, and allowed to drain. Foam quality and foam half-life of the oligomer/methanol solution were evaluated according to the following equations:

$$\Gamma = \text{foam quality} = \frac{(\text{foam volume})(\text{specific gr. solution}) - \text{foam weight}}{(\text{foam volume})(\text{specific gr. solution})} \times 100$$

$t_{\frac{1}{2}}$ = foam half-life = time (in seconds) required for one half of the liquid in the foam to drain from the foam. Such volume of drained liquid equals:

$$\frac{\text{foam weight}}{(\text{specific gr. solution})(2)}$$

For the oligomer/methanol solution of this example, the foam quality was 69 and the foam half-life was 170 seconds.

EXAMPLES 2-17

Several fluoroaliphatic radical-containing oligomers were prepared and tested as in Example 1. The oligomers of Examples 6 and 14 were prepared in a three-necked flask and stirred under nitrogen gas at 60°–70° C. for about 20 hours. Some of the oligomers shown below (e.g., Examples 4 and 17) formed cloudy solutions in methanol while others (e.g., Example 5) formed a clear solution. A clear solution of an oligomer similar to the oligomer of Example 4 was obtained by altering the oligomer polymerization conditions as follows. An oligomer was prepared using 28.8 g $C_8F_{17}SO_2N(CH_3)C_2H_4OCOCH=CH_2$, 11.2 g $CH_2=CHCOOH$, 0.06 g azobisisobutyronitrile initiator, 0.4 g n-octyl mercaptan chain transfer agent, and a solvent mixture prepared from 14.4 g of ethanol and 105.6 g ethyl acetate. A 1% solution in methanol of the resulting oligomer was clear, and had a foam quality of 66 and a foam half-life of 200 seconds.

The foam quality and foam half-life of compositions containing the oligomers of Examples 2–17 in reagent grade methanol are set forth below in Table I.

TABLE I

| | Example | | | | | | | | | | | | | | | |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| Monomer (grams) | | | | | | | | | | | | | | | | |
| $C_8F_{17}SO_2N(CH_3)C_2H_4OCOCH=CH_2$ | 34 | 32 | 28.3 | 28.6 | 40 | 30 | 30 | 20 | | | 30 | 22.5 | 35 | 30 | | 28.8 |
| $C_8F_{17}SO_2N(CH_3)C_2H_4OCOC(CH_3)=CH_2$ | | | | | | | | | 20 | | | | | | | |
| $C_8F_{17}SO_2N(C_2H_5)C_2H_4OCOCH=CH_2$ | | | | | | | | | | 20 | | | | | 70 | |
| $C_8F_{17}SO_2N(C_4H_9)C_2H_4OCOCH=CH_2$ | | | | | | | | | | | | | | | | |
| $CH_2=CHCOOH$ | 6 | 8 | 10.8 | 11.4 | 4 | 5 | 5 | 10 | 10 | 10 | | | | | | 10.8 |
| $CH_2=C(CH_3)COOH$ | | | | | | | | | | | 10 | 7.5 | | | | |
| $CH_2=CHCON(CH_3)_2$ | | | | | | | | | | | | | 18.5 | 10 | | |
| $CH_2=CHCOOCH_2CH_2OH$ | | | | | | | | | | | | | | | 30 | |
| $CH_2=CHCOOC_2H_5$ | | | | | | 5 | 5 | 10 | 10 | | | | | | | |
| $CH_2=CHCOOC_4H_9$ | | | | | | | | | | 10 | | | | | | |
| Initiator (grams) | | | | | | | | | | | | | | | | |
| Azobisisobutyronitrile | 0.15 | 0.15 | | 0.3 | 0.75 | 0.3 | 0.3 | 0.3 | 0.3 | 0.3 | 0.3 | | 0.75 | 0.3 | | |
| Benzoyl Peroxide | | | | | | | | | | | | 0.23 | | 0.75 | | |
| Trioctylmethylammonium persulfate | | | 0.45 | | | | | | | | | | | | | 0.3 |
| Chain Transfer Agent (grams) | | | | | | | | | | | | | | | | |
| n-Octyl mercaptan | 0.4 | 0.4 | | 0.4 | | 0.4 | | 0.4 | | | 0.4 | 0.3 | 0.4 | | | |
| Mercaptoacetic acid | | | 0.4 | | | | | | | | | | | | | 0.4 |
| Solvent (grams) | | | | | | | | | | | | | | | | |
| Tetrahydrofuran | 120 | 120 | 120 | 120 | | 120 | 120 | | | | 120 | | | 120 | 400 | 120 |
| Methyl Alcohol | | | | | 500 | | | | | | | | | 500 | | |
| Ethyl Acetate | | | | | | | | 120 | 120 | 120 | | | | | | |
| 2-Butoxyethanol | | | | | | | | | | | | 120 | | | | |
| FOAM PROPERTIES (1% in $CH_3OH$) | | | | | | | | | | | | | | | | |
| Foam Quality, $\Gamma$ | 60 | 67 | 69 | 65 | 69 | 65 | 65 | 65 | 65 | 65 | 62 | 61 | 65 | 62 | 69 | 69 |
| Foam Half-Life, $t_{\frac{1}{2}}$ (sec) | 155 | 190 | 250 | 120 | 70 | 145 | 125 | 80 | 85 | 70 | 120 | 130 | 60 | 89 | 123 | 305 |

These examples illustrate the foam stability of foamed methanol compositions of this invention. Foam half-lives were as high as 305 seconds. In these examples, compositions prepared using perfluorooctyl-N-methyl-sulfonamido acrylate monomer and acrylic acid comonomer generally gave the longest foam half-lives.

EXAMPLE 18

Using the method of Example 1, a terpolymer was prepared from 19.5 g $C_8F_{17}SO_2N(CH_3)C_2H_4OCOCH=CH_2$, 7.5 g $CH_2=CHCOOH$, and 3.0 g $CH_2=CHCO(OC_2H_4)_{16}OCH_3$. The initiator for the polymerization was 0.24 g azobisisobutyronitrile, the chain transfer agent was 0.18 n-octyl mercaptan, and the solvent was a mixture of 30 g isopropyl alcohol and 30 g of methyl isobutyl ketone. The resulting oligomer was added to methanol to form a 1 wt. % solution, and tested as in Example 1. The solution had a foam quality of 61 and a foam half-life of 85.

This Example showed that an oligomer containing poly(oxyalkylene) groups and greater than 10% —COOH moieties (i.e. "A" moieties) could be used in this invention.

EXAMPLE 19

In a series of seven runs, the effect of adding various adjuvants to the oligomer/methanol solution of Example 1 was evaluated. The results are set forth below in Table II.

TABLE II

| Run No. | Concentration of oligomer, wt. % | Adjuvant | Wt. % adjuvant | Foam quality Γ | Foam half-life $t_{\frac{1}{2}}$ (sec) |
|---|---|---|---|---|---|
| 1 | 1.0 | None | — | 69 | 170 |
| 2 | 1.0 | $H_2O$ | 10 | 64 | 280 |
| 3 | 1.0 | conc HCl | 10 | 64 | 480 |
| 4 | 0.1 | conc HCl | 10 | 62 | 160 |
| 5 | 1.0 | conc HCl "Corexit 8503"[a] | 10 1 | 63 | 350 |
| 6 | 1.0 | $H_2O$ KCl | 21 1.5 | 63 | 615 |
| 7 | 1.0 | $CH_3COOH$ | 10 | 68 | 245 |

[a]Corrosion inhibitor for use in acidizing oil well fluids, commercially available from Exxon Chemical Co., U.S.A.

These examples show that the addition of the above adjuvants does not reduce the foam half-life of the oligomer/methanol solution of Example 1, although foam quality was generally lowered by such additions.

EXAMPLE 20

In a series of nine runs, the effect upon foam quality and foam half-life of various oligomer concentrations was evaluated. The oligomer/methanol solutions of runs 1–4 contained the oligomer of Example 1 in methanol. The oligomer/methanol solutions of runs 5–9 contained the oligomer of Example 4. The foam quality and foam half-life of the resulting compositions are set forth below in Table III.

TABLE III

| Run no. | Oligomer of Example No. | Oligomer concentration, % solids by weight | Foam quality Γ | Foam half-life $t_{\frac{1}{2}}$ (sec) |
|---|---|---|---|---|
| 1 | 1 | 0.175 | 59 | 30 |
| 2 | 1 | 0.25 | 68 | 75 |
| 3 | 1 | 0.5 | 69 | 130 |
| 4 | 1 | 1.0 | 69 | 170 |
| 5 | 4 | 0.10 | — | <5 (no foam) |
| 6 | 4 | 0.175 | 55 | 10 |
| 7 | 4 | 0.25 | 65 | 60 |
| 8 | 4 | 0.50 | 69 | 145 |
| 9 | 4 | 1.0 | 69 | 235 |

These runs show that increased concentration of oligomer in methanol generally yielded higher foam quality and/or foam half-life.

EXAMPLE 21

In a series of 2 runs, the effect of combining the oligomer/methanol solution of Example 1 with a propping agent was evaluated. In a first (control) run, 0.25 g of the oligomer of Example 1 and 25 g of methanol were combined and shaken vigorously for 5 seconds in a 60 ml "French square" glass bottle. The shaken solution was allowed to stand for 10 seconds, then the foam height above the solution was measured. The foam height was about 33 mm.

In a second run, a similar solution was prepared, but 3 g of 20–30 mesh Ottawa sand was added to the solution. The solution was shaken vigorously for 5 seconds in the "French square" bottle, and found to have a foam height of 28 mm after a 10 second standing time. Some of the sand was suspended in the foam.

These runs show that a conventional propping agent could be suspended in the well treatment fluids of this invention.

COMPARATIVE EXAMPLE

In a series of 7 runs, several compositions outside the scope of this invention were prepared and evaluated as in Example 1. The oligomers of runs 6 and 7 were prepared in a three-necked flask and stirred under nitrogen gas at 60°–70° C. for about 20 hours. The foam quality and foam half-life of the resulting compositions are set forth below in Table IV.

TABLE IV

| | Comparative run no. | | | | | | |
|---|---|---|---|---|---|---|---|
| | 1[a] | 2 | 3 | 4 | 5 | 6[b] | 7[c] |
| Monomer (grams) | | | | | | | |
| $C_8F_{17}SO_2N(CH_3)C_2H_4OCOCH=CH_2$ | | 38 | 36 | 20 | | 7 | 40 |
| $C_3F_{17}SO_2N(CH_3)C_2H_4OCOC(CH_3)=CH_2$ | | | | | 30 | | |
| $C_8F_{17}SO_2N(C_2H_5)C_2H_4OCOC(CH_3)=CH_2$ | 28 | | | | | | |
| $CH_2=CHCOOH$ | 7 | 2 | 4 | 1 | 5 | | |
| $CH_2=CHCONHCH_2OH$ | | | | | | 3.5 | |
| $CH_2=CHCONH_2$ | | | | | | | 14 |
| $CH_2=CHCOOC_2H_5$ | | | | 19 | 5 | | |
| Initiator (grams) | | | | | | | |
| Azobisisobutyronitrile | | 0.15 | 0.15 | 0.6 | 0.3 | 0.125 | 0.5 |
| Benzoyl peroxide | 0.35 | | | | | | |
| Chain transfer agent (grams) | | | | | | | |
| n-Octyl mercaptan | | 0.4 | 0.4 | | | | |
| Solvent (grams) | | | | | | | |
| Ethyl Alcohol | 8 | | | | | | |
| Tetrahydrofuran | | 120 | 120 | 120 | | | |
| Isopropyl alcohol | | | | | | 120 | 630 |
| Ethyl Acetate | 57 | | | | 120 | | |
| FOAM PROPERTIES (1% in $CH_3OH$) | | | | | | | |
| Foam quality, Γ | 53 | 0 | 42 | 53 | 60 | 35 | 0 |
| Foam half-life, $t_{\frac{1}{2}}$ (sec.) | 25 | 0 | 45 | 22 | 20 | 5 | 0 |

[a]U.S. Pat. No. 3318852 (Dixon), Ex. 8.
[b]Soluble fraction (50%) tested.
[c]Soluble fraction (25%) tested.

These comparative runs show that fluoroaliphatic radical-containing oligomers containing more than about 50 wt.% fluorine (see, e.g., the oligomer of comparative run No. 2, which contained about 50.2 weight percent fluorine) exhibited poor foam quality at a 1 wt.% concentration in methanol. Foam quality and foam half-life initially improved as fluorine content fell below about 50 wt.%. For example, in comparative run No. 3, an oligomer containing about 47.6 wt.% fluorine had a foam quality of 42 and a foam half-life of 45 at a 1 wt.% concentration in methanol. An oligomer prepared from the same monomers but containing about 44.9 wt.% fluorine (see Example No. 2, above) had a foam quality of 60 and a foam half-life of 155 at a 1 wt.% concentration in methanol.

These comparative runs also show that a previously described fluoroaliphatic oligomer prepared from a fluoroaliphatic radical-containing methacrylate and acrylic acid according to Example 8 of U.S. Pat. No. 3,318,852, yielded foam quality of 53 and foam half-life of 25 seconds at a 1 wt.% concentration in methanol. (See comparative run No. 1).

Various modifications and alterations of this invention will be apparent to those skilled in the art without departing from the scope and spirit of this invention and the latter should not be restricted to that set forth herein for illustrative purposes.

What is claimed is:

1. In a method for treating an oil- and/or gas-bearing formation by injecting therein a substantially water-free methanol-containing well treatment fluid, the improvement comprising adding to said fluid an amount, sufficient to make said fluid foamable, of polymer comprising:
   (a) a polymeric backbone;
   (b) three or more fluorine-containing moieties of the formula $R_fQ$ attached to said backbone, wherein $R_f$ is a monovalent, fluorinated aliphatic radical terminating in at least one perfluoromethyl group and having 5 to 14 carbon atoms, and Q is a linkage or bridge through which $R_f$ is attached to said backbone; and
   (c) two or more moieties of the formula $AQ'$ attached to said backbone, wherein A is a polar methanol-solubilizing group, $Q'$ is a linkage or bridge through which A is attached to said backbone, greater than about 10% by weight $AQ'$ moieties are present in said polymer, and $AQ'$ is a radical which, when the valence bonds of $AQ'$ are satisfied by hydrogen atoms, has a solubility in methanol at 25° C. of at least about 20% by weight;
said polymer containing between about 25 to about 50% by weight fluorine and having a number average molecular weight below about 100,000, and a 1 weight percent solution of said polymer in reagent grade methanol having at 25° C. a foam quality of at least about 60 and a foam half-life of at least about 50 seconds.

2. A method according to claim 1, wherein $R_f$ is a perfluorinated aliphatic radical having 6 to 10 carbon atoms and Q is sulfonamidoalkylene.

3. A method according to claim 1, wherein A comprises carbonyl groups.

4. A method according to claim 1, wherein said polymer is derived from the polymerization of about 70 to 80% by weight of fluoroaliphatic radical-containing acrylate or methacrylate with about 30 to 20% by weight carboxyl-containing acrylate or methacrylate.

5. A method according to claim 1, wherein said polymer comprises three or more first units of the formula:

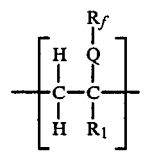

and two or more second units of the formula

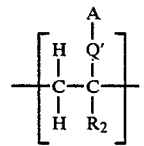

wherein:
$R_1$ is H or $CH_3$;
$R_2$ is H, $CH_3$ or Cl;
A contains at least one carboxyl group; and each of said first and second units is the same as or different from other of said first and second units in said polymer.

6. A method according to claim 1, wherein said amount of polymer added to said fluid is between about 0.2 and 2 weight %.

7. A method according to claim 6, wherein said amount of polymer added to said fluid is less than about 1 weight %.

8. A well treatment fluid composition, comprising substantially water-free methanol together with an amount sufficient to make said fluid foamable, of polymer as methanol foaming agent, said polymer comprising three or more first units derived from fluoroaliphatic acrylate or methacrylate and two or more second units derived from carboxyl-containing acrylate or methacrylate, said first units containing monovalent, fluorinated aliphatic radicals terminating in at least one perfluoromethyl group and having 5 to 14 carbon atoms, said second units containing greater than about 10% by weight $AQ'$ moieties where A contains at least one carboxyl group and $Q'$ is a linkage or bridge through which A is attached to said second units, said polymer containing between about 25 to about 50% by weight fluorine and having a number average molecular weight below about 100,000, and a 1 weight % solution of said polymer in reagent grade methanol having at 25° C. a foam quality of at least about 60 and a foam half-life of at least about 50 seconds.

9. A well treatment fluid composition, comprising substantially water-free methanol together with an amount, sufficient to make said fluid foamable, of polymer as methanol foaming agent, said polymer comprising three or more first units of the formula:

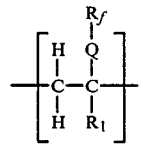

and two or more second units of the formula:

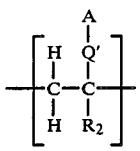

wherein:
- $R_f$ is a monovalent, fluorinated aliphatic radical terminating in at least one perfluoromethyl group and having 5 to 14 carbon atoms;
- Q is a linkage or bridge through which $R_f$ is attached to said first unit;
- Q' is a linkage or bridge through which A is attached to said second unit;
- $R_1$ is H or $CH_3$;
- $R_2$ is H, $CH_3$, or Cl;
- A contains at least one carboxyl group; greater than about 10% by weight AQ' moieties are present in said polymer, and each of said first and second units is the same as or different from other of said first and second units in said polymer;

said polymer containing between about 25 to about 50% by weight fluorine and having a number average molecular weight below about 100,000, and a 1 weight % solution of said polymer in reagent grade methanol having at 25° C. a foam quality of at least about 60 and a foam half-life of at least about 50 seconds.

10. A well treatment fluid composition according to claim 9, wherein $R_f$ is a perfluorinated aliphatic radical having 6 to 10 carbon atoms and Q is sulfonamidoalkylene.

11. A well treatment fluid composition according to claim 9, wherein said polymer is derived from the polymerization of about 70 to 80% by weight of fluoro-aliphatic acrylate or methacrylate with about 30 to 20% by weight carboxyl-containing acrylate or methacrylate, said polymerization being carried out in the presence of about 0.2 to 2% weight of chain transfer agent.

12. A well treatment fluid composition according to claim 9, wherein $R_1$ is H.

13. A well treatment fluid composition according to claim 9, wherein said amount of said polymer in said fluid is between about 0.2 and 2 weight %.

14. A well treatment fluid composition according to claim 13, wherein said amount of polymer in said fluid is less than about 1 weight %.

15. A well treatment fluid composition according to claim 13, further comprising sand as a propping agent.

16. A well treating fluid composition according to claim 13, further comprising acidizing agent.

* * * * *